US006631469B1

(12) United States Patent
Silvester

(10) Patent No.: US 6,631,469 B1
(45) Date of Patent: Oct. 7, 2003

(54) METHOD AND APPARATUS FOR PERIODIC LOW POWER DATA EXCHANGE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 09/617,364

(22) Filed: Jul. 17, 2000

(51) Int. Cl.⁷ .............................. G06F 9/00; G06F 1/32
(52) U.S. Cl. ........................................... 713/2; 713/320
(58) Field of Search ............................. 713/1, 2, 300, 713/310, 320, 323, 502

(56) References Cited

U.S. PATENT DOCUMENTS

| | | | | | |
|---|---|---|---|---|---|
| 5,892,909 A | * | 4/1999 | Grasso et al. | ................ | 709/201 |
| 5,974,552 A | * | 10/1999 | Lim et al. | .................... | 713/300 |
| 6,047,260 A | * | 4/2000 | Levinson | ........................ | 705/9 |
| 6,243,821 B1 | * | 6/2001 | Reneris | ........................ | 713/323 |
| 6,275,932 B1 | * | 8/2001 | Yamaguchi et al. | ........... | 713/2 |
| 6,367,074 B1 | * | 4/2002 | Bates et al. | ................. | 711/170 |
| 2002/0029275 A1 | * | 3/2002 | Selgas et al. | ............... | 709/227 |

* cited by examiner

*Primary Examiner*—Dennis M. Butler
(74) *Attorney, Agent, or Firm*—Blakely, Sokoloff, Taylor & Zafman LLP

(57) ABSTRACT

A computer system user programs a periodic interval into a computer system and subsequently places the computer system into a sleep mode. A wakeup alarm is triggered in the computer system according to the periodic interval, and, in response, the computer system automatically exits the sleep mode and enters a wake mode. The computer system then automatically exchanges data, such as email, with a host and returns to the sleep mode. The operating system that may be booted on, the computer system in response to the wakeup alarm may be a smaller, lower-power operating system than the operating system the user uses to program the periodic interval.

21 Claims, 3 Drawing Sheets

METHOD AND APPARATUS FOR PERIODIC LOW POWER DATA EXCHANGE

The present invention relates to computer systems and more particularly to a mobile computer system that periodically communicates with a host to exchange data according to user-defined parameters.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. As processor speed increases, the power consumed by the processor and other computer components tends to increase as well. Unfortunately, the increased power consumption reduces battery life in mobile systems.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a mobile computer system, running a full operating system (OS), provides a user with some data exchange options. Using these options, the user sets a periodic interval and connection hierarchy for data exchange. The user subsequently places the computer system into a sleep mode; During the sleep mode, many or all of the components within the computer system are powered down, including, for example, the processor and main memory. A real time clock, however, continues to operate.

When the clock reaches a time determined by the periodic interval set by the user, a wakeup alarm is triggered. In response to this wakeup alarm, several actions are automatically taken by the computer system. The computer system automatically exits the sleep mode and enters a wake mode in which the same or a different processor is powered up. A low-power, miniature OS (mini OS) is booted onto the computer system, and the system automatically searches for an appropriate communication device with which to connect to a host according to the connection hierarchy set by the user.

Once connected, the computer system exchanges data, such as email, with the host. Data that is downloaded from the host may be stored in a low-power non-volatile memory location within the computer system. Subsequently, the computer system may be automatically re-programmed to wake itself at a later time, and the computer system then automatically re-enters the sleep mode. The computer system may remain in this sleep mode until the clock triggers the next wakeup alarm, and the process repeats itself. When the user desires access to the downloaded data, the user causes the full OS to be booted onto the computer system, and the data is accessed from the non-volatile memory.

In this manner, relatively up-to-date email and other data is continually stored and updated on the computer system, but very little battery power is used because the computer components only operate intermittently (according to the periodic interval). A more detailed description of embodiments of the present invention, including various configurations and implementations, is provided below.

Figure 1:
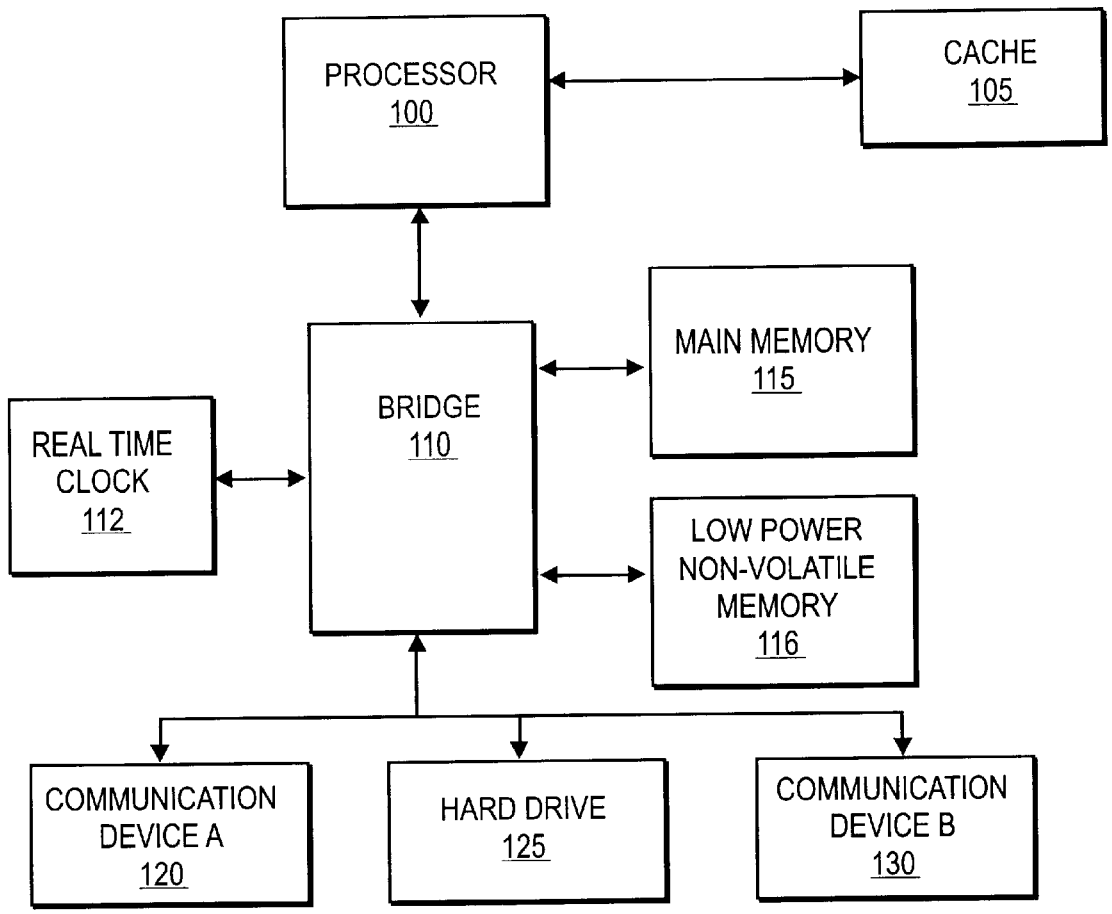
FIG. 1 is a computer system formed in accordance with an embodiment of the present invention.

FIG. 1 is a computer system formed in accordance with an embodiment of the present invention. Processor 100 may be a single processor or may represent multiple processors in a symmetric or asymmetric multiprocessor system. Processor 100 is coupled to cache 105 and to bridge 110. Main memory 1 15 and low power non-volatile memory 116 are both coupled to bridge 110. Low power non-volatile memory 116 may include, for example, one or more flash memory devices or battery-backed RAM devices. In accordance with one embodiment of the present invention, the power used to operate memory 116 is less than the power used to operate main memory 115 under normal operating conditions.

Real time clock 112 of FIG. 1 is also coupled to bridge 110, as is communication device A 120 and communication device B 130. Communication devices A and B, 120 and 130, may include, for example, one or more short range or long range wireless transceivers, local area network (LAN) ports, or modems.

Hard drive 125 of FIG. 1 is also coupled to bridge 110. Note that a method of the present invention, as described in more detail below in conjunction with FIG. 2, may be implemented by the computer system of FIG. 1 programmed to execute various steps of the method. Such a program may reside, at least in part, on any computer readable medium such as a magnetic disk (e.g. a hard drive or floppy disk), an optical disk (e.g. a CD or DVD), a semiconductor device (e.g. Flash, EPROM, or RAM), or carrier wave, all of which are collectively represented by hard drive 125 of FIG. 1.

Figure 2:
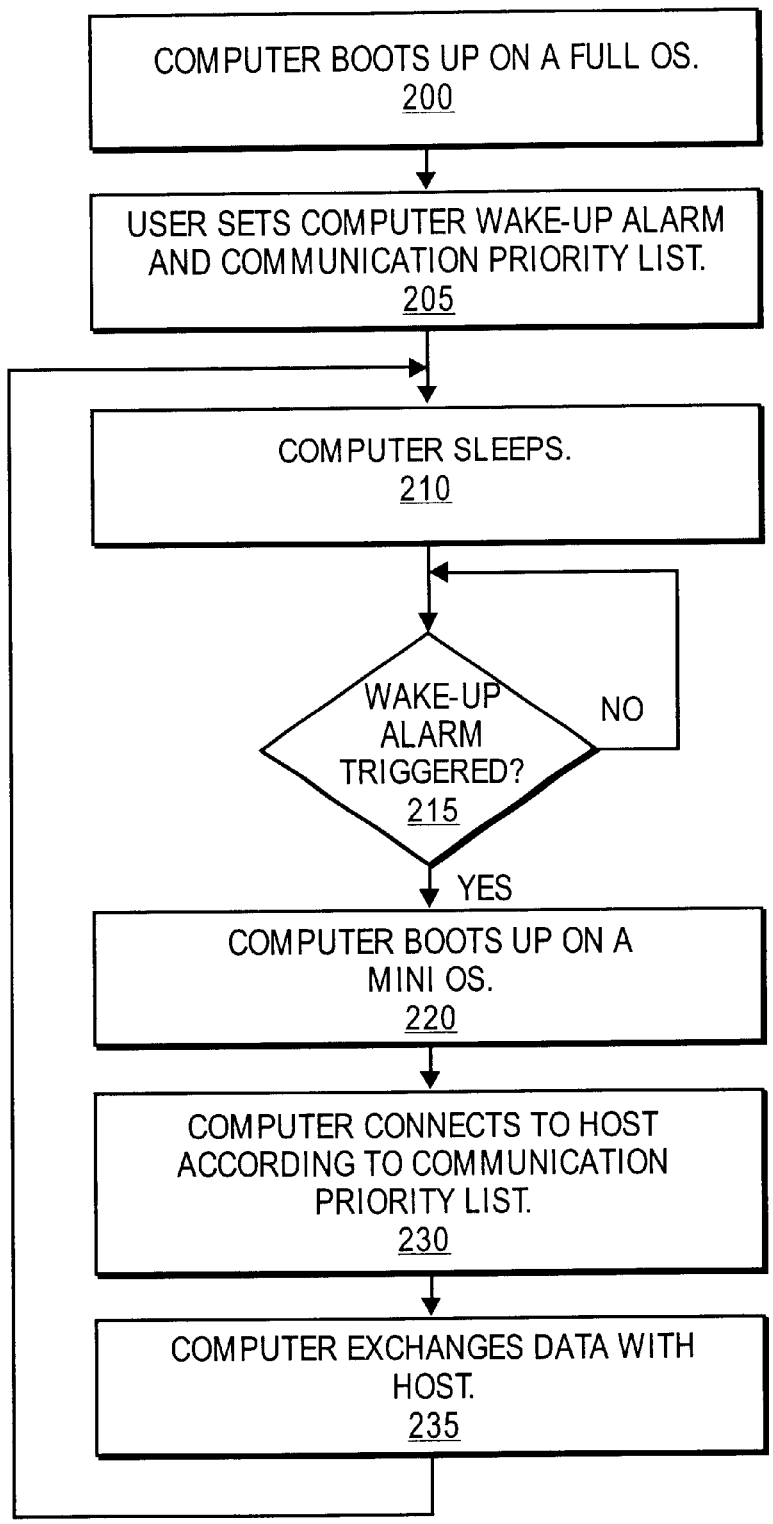
FIG. 2 is a flow chart showing a method of the present invention.

FIG. 2 is a flow chart showing a method of the present invention. At step 200, a full OS is booted onto a mobile computer such as the computer system of FIG. 1. A full OS may include, for example, a graphical user interface and device drivers for most or all installed components of the system. All or a portion of the full OS, along with all or portions of running applications, reside in main memory 115 while running. The remainder of these software programs reside on hard drive 125.

Figure 3:
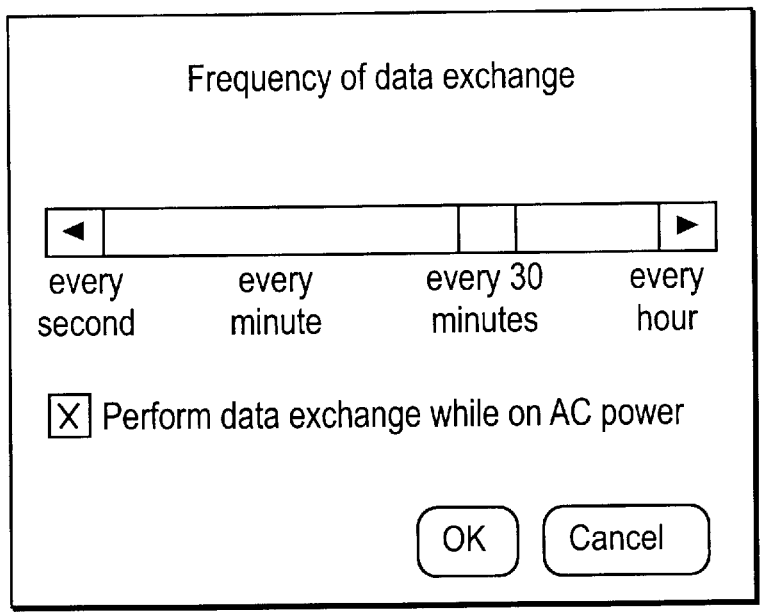
FIG. 3 is a first data entry window in accordance with an embodiment of the present invention.
Figure 4:
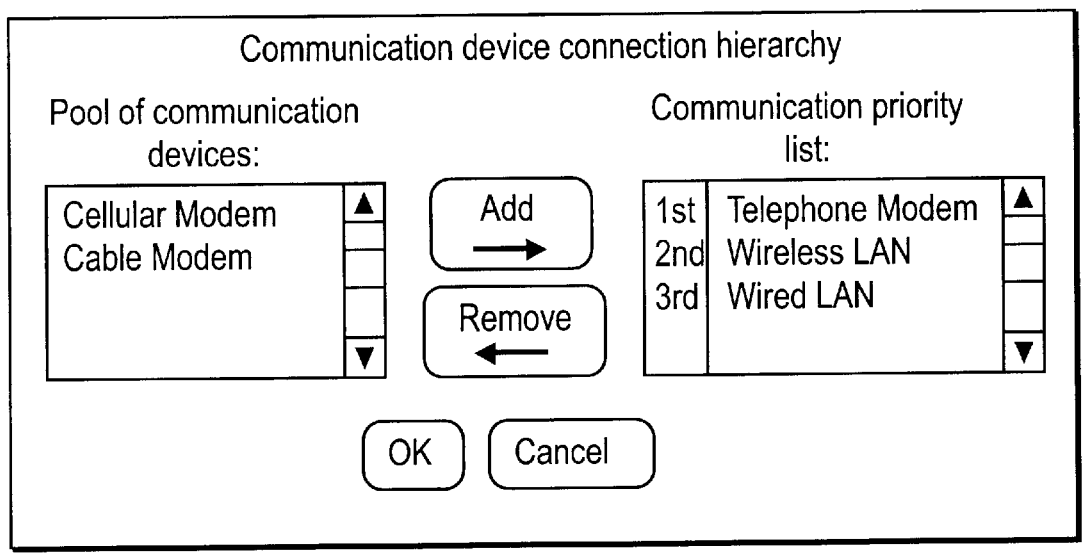
FIG. 4 is a second data entry window in accordance with an embodiment of the present invention.

While the full OS is running on the computer system, an application may be launched to allow the user to set the computer wakeup alarm and communication priority list at step 205 of FIG. 2. An example of a graphical interface of such an application is shown in FIGS. 3 and 4. As shown in FIG. 3, a first data entry window is presented to the user to allow the user to set the periodic interval of the wakeup alarm of the computer system.

The shorter the periodic interval set by the user, the more often the computer system will be updated with new data from a host computer. As a trade-off, however, more frequent updates will result in shorter battery life because each update consumes battery power. In contrast, longer periodic intervals will result in less frequent updates but longer battery life. In accordance with an embodiment of the present invention, the periodic interval is selected by the user to balance the user's battery life with their requirements for timelines of information. In accordance with one embodiment of the present invention, the period of the periodic interval may be set by a user to be a recurring time interval, such as "every 20 minutes." For another embodiment, the period of the periodic interval may be set to be a time of day, or multiple times of the day. For example, a user may set the periodic interval to be "daily at 6:00 a.m. and 1:00 p.m." Note that the period of the periodic interval need not be regular. For example, a user may set a periodic interval that is daily but excludes weekends and holidays In accordance with the embodiment of FIG. 3, the user is presented with an option to request that data gathering be performed while the computer is operating on AC power (e.g. when the computer system is plugged in and not running off its battery). For another embodiment, a user may be enabled to set a first periodic interval for data exchange for use when the computer is running on battery power and another periodic interval for data exchange for use when the computer is running on AC power. Alternatively, the periodic interval may be set by a user to be a function of not only time but also battery charge. For example, a user may set the periodic interval to be more frequent when the battery is fully charged, and less frequent when the battery is less than fully charged.

As 'shown in FIG. 4, a second data entry window is presented to the user to allow the user to set the connection hierarchy of the computer system. The user might have a preference as to how the computer system connects to the host to perform automatic data exchange, and which communication devices are used. For example, the user might prefer that the computer system connect to the host using a modem that is coupled to a telephone jack by a wire, if such a connection is available. If this connection is not available, the user might prefer that the next means by which the computer system connects to the host is by a wireless LAN connection initiated by the computer system. If this connection is not available, the user might prefer that the next means by which the computer system connects to the host is by a wired LAN connection initiated by the computer system, and so on. As shown in FIG. 4, the user may be presented with an option to select or deselect which communication devices the computer system may use to connect to a host. For example, a user might prefer that the computer system not use a cellular communication device or a cable modem to connect to the host.

Turning back to FIG. 2, at step 210 the computer is placed into a sleep mode. A sleep mode may be a suspend mode or an off state. In this sleep mode, the contents of the main memory of the computer system and the processor states are not maintained on volatile memory devices. Power to the processor and other components of the system may be reduced or eliminated. Clock 112, however, continues to run.

At step 215 of FIG. 2 it is determined if the wakeup alarm is to be triggered. This may be accomplished by bridge 110, clock 112, or another component by comparing the clock signal from clock 112 to a value generated using the periodic interval set by the user.

Once triggered, the computer enters a wake mode and boots up on a mini OS at step 220 of FIG. 2 in response to the wakeup alarm. For one embodiment of the present, invention, this mini OS may reside wholly or in part in low power non-volatile memory 116 of FIG. 1. In comparison to the full OS discussed above, the mini OS is smaller in size and consumes less power when running. The mini OS may be a different software operating environment than the full OS, or it may be a subset in function and feature of the full OS.

For example, the mini OS may be a non-graphical user interface OS that lacks support and drivers for one or more peripheral components that are not necessary to complete the automated data exchange task. For example, unlike the full OS, the mini OS may not include sound card or video drivers, and these devices may not be powered up when the computer enters the wake mode in response to the wakeup alarm. For one embodiment, it takes less than one third as much time for the computer system to boot up on the mini OS as it takes to boot up on the full OS. In accordance with an embodiment of the present invention, the computer system may take less than ten seconds to boot up on the mini OS while it takes more than thirty seconds to boot up on the full OS.

While running the mini OS, processing on the computer system may be done by processor 100 or a co-processing component of processor 100 of FIG. 1. For one embodiment, processor 100 primarily operates in a low power or power conservation mode while running the mini OS. For example, processor 100 may operate at a lower voltage and lower frequency while running the mini OS than while running the full OS under normal, high-demand conditions. Alternatively, processing may be done by circuitry within bridge 110, or other components of the computer system, while running the mini OS.

At step 230 of FIG. 2, the computer connects to the host according to the communication priority list set by the user as the hierarchy of connection options. The host may be a server, workstation, desktop computer system, or any other computer system.

Once connected, the computer system exchanges data with the host at step 235 of FIG. 2. This data may include, for example, email, database contents, audio, video, or other information. In accordance with one embodiment of the present invention, data to be sent to the host (e.g. email in the user's email "outbox") is stored in low power non-volatile memory 116 of FIG. 1, and data received from the host is stored in memory 116 as well. For one embodiment, the mini OS does not support full operation of main memory 115 or hard drive 125. Instead, memory 116 may be used as the computer system memory while running the mini OS, thereby conserving battery life.

After the computer system exchanges data with the host at step 235 of FIG. 2, the computer goes back into the sleep mode at step 210 and waits for the next wakeup alarm to be triggered. When the user next accesses the computer system, the user boots the system up on the full OS, and the data received from the host and stored in the low-power non-volatile memory may be accessed.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method comprising:
    enabling a computer system to enter a sleep mode;
    enabling a wakeup alarm to be triggered in the computer system according to a periodic interval;

enabling, via a first processor, a first operating system to automatically be booted onto the computer system in response to the wakeup alarm, the first operating system being a lower power operating system than the second operating system;

enabling the computer system to automatically exchange data with a host in response to the wakeup alarm;

enabling the computer system to automatically re-enter the sleep mode after exchanging the data;

enabling, via a second processor, the second operating system to be booted.

2. The method of claim 1, further comprising enabling the computer system to automatically connect to the host in response to the wakeup alarm.

3. The method of claim 1, further comprising enabling a user of the computer system to set the periodic interval.

4. The method of claim 1, further comprising enabling a user of the computer system to set the periodic interval using the second operating system running on the computer system.

5. The method of claim 4, wherein the first operating system is a non graphical user interface (GUI) operating system and the second operating system is a GUI operating system.

6. The method of claim 1, wherein automatically exchanging data with the host includes automatically downloading email from the host and storing it in a non volatile memory location within the computer system.

7. The method of claim 1, wherein automatically exchanging data with the host includes automatically uploading to the host email stored in a non-volatile memory location within the computer system.

8. The method of claim 1, wherein enabling the computer system to automatically exchange data with the host includes enabling the computer to automatically connect to the host according to a hierarchy of connection options.

9. The method of claim 8, further comprising enabling a user of the computer system to set the hierarchy of connection options.

10. The method of claim 8, further comprising enabling a user of the computer system to set the hierarchy of connection options using the second operating system running on the computer system.

11. A computer system programmed to implement the method of claim 1.

12. A computer system programmed to implement the method of claim 4.

13. A computer system comprising:
a full operating system;
a mini operating system;
a communication device;
a clock to trigger a wakeup alarm;
a first processor to automatically boot up the mini operating system, exchange data with a host via the communication device, and place the computer system into a sleep mode in response to the wakeup alarm; and
a second processor to run the full operating system.

14. The computer system of claim 13, further comprising volatile and non-volatile memory, the volatile memory to be used as the primary memory of the computer system when the full operating system is running on the system, and the non-volatile memory to be used as the primary memory of the system when the mini operating system is running on the system.

15. The computer system of claim 13, wherein the full operating system is used to allow a user to preset a time at which the wakeup alarm is triggered.

16. The computer system of claim 13, wherein the full operating system is used to allow a user to determine the communication device, of a plurality of communication devices, via which the first processor automatically exchanges data with the host.

17. A computer-readable medium including a plurality of instructions readable therefrom, the instructions, when executed by a computer system, cause the computer system to perform operations comprising:

triggering a wakeup alarm;

booting a first operating system, via a first processor, onto the computer system in response to the wakeup alarm;

exchanging data with a host in response to the wakeup alarm;

automatically re-entering a sleep mode after exchanging the data; and booting a second operating system, via a second processor, the first operating system being a lower power operating system than the second operating system.

18. The medium of claim 17, wherein the operations further comprise enabling a user of the computer system to set the periodic interval using the second operating system running on the computer system, the first operating system being a lower power operating system than the second operating system.

19. The medium of claim 17, wherein the first operating system is a non-graphical user interface (GUI) operating system and the second operating system is a GUI operating system.

20. The medium of claim 17, wherein exchanging data with the host includes automatically downloading email from the host and storing it in a non-volatile memory location within the computer system.

21. The medium of claim 17, wherein the operations further comprise enabling a user of the computer system to set a hierarchy of connection options for the exchanging of the data with the host wherein the enabling uses the second operating system running on the computer system, the first operating system taking less than one third as much time to boot up as the second operating system.

* * * * *